Oct. 9, 1934.   R. K. LEE   1,975,960
INTERNAL COMBUSTION ENGINE MOUNTING
Filed June 6, 1931    3 Sheets-Sheet 3

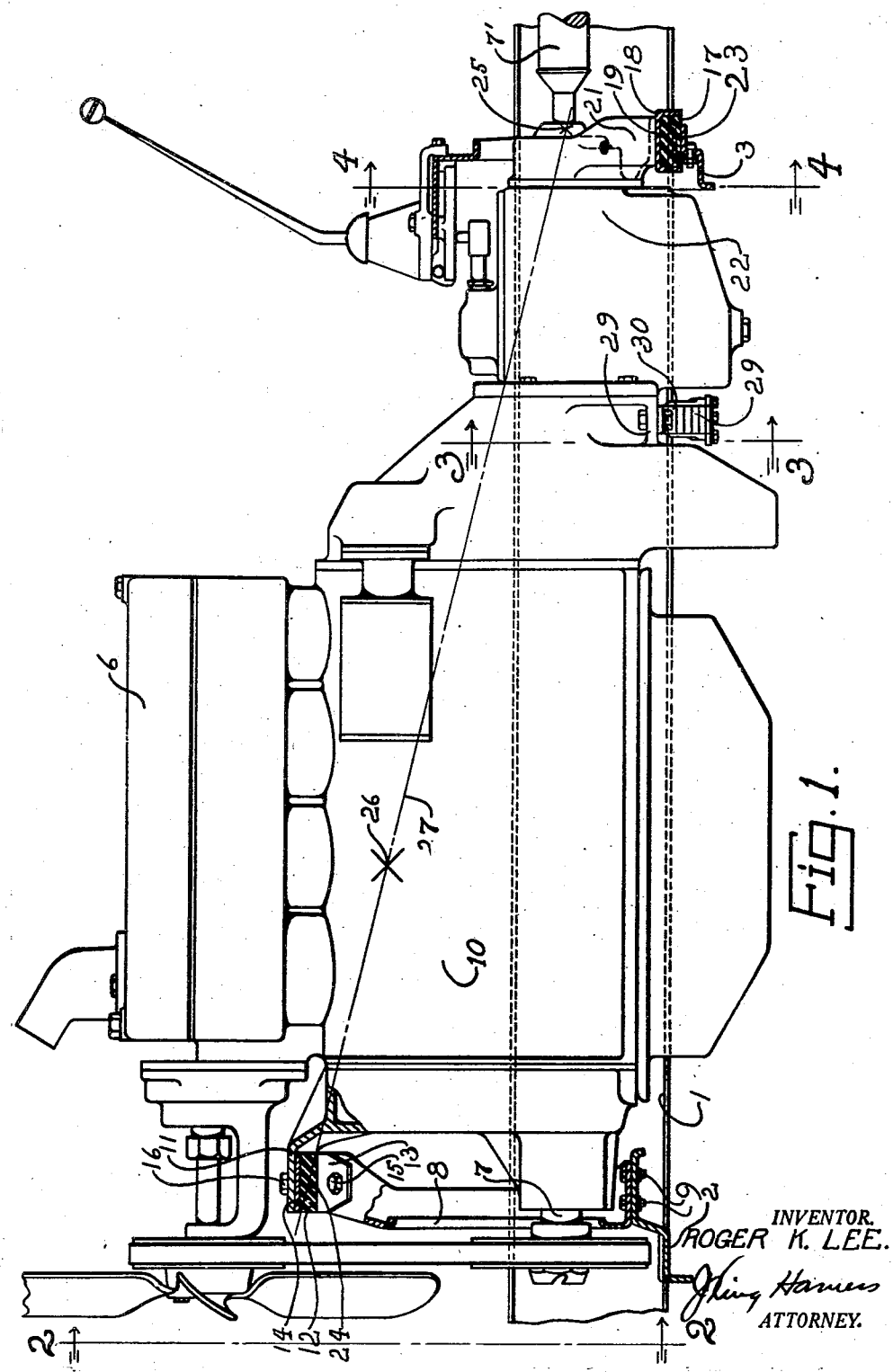

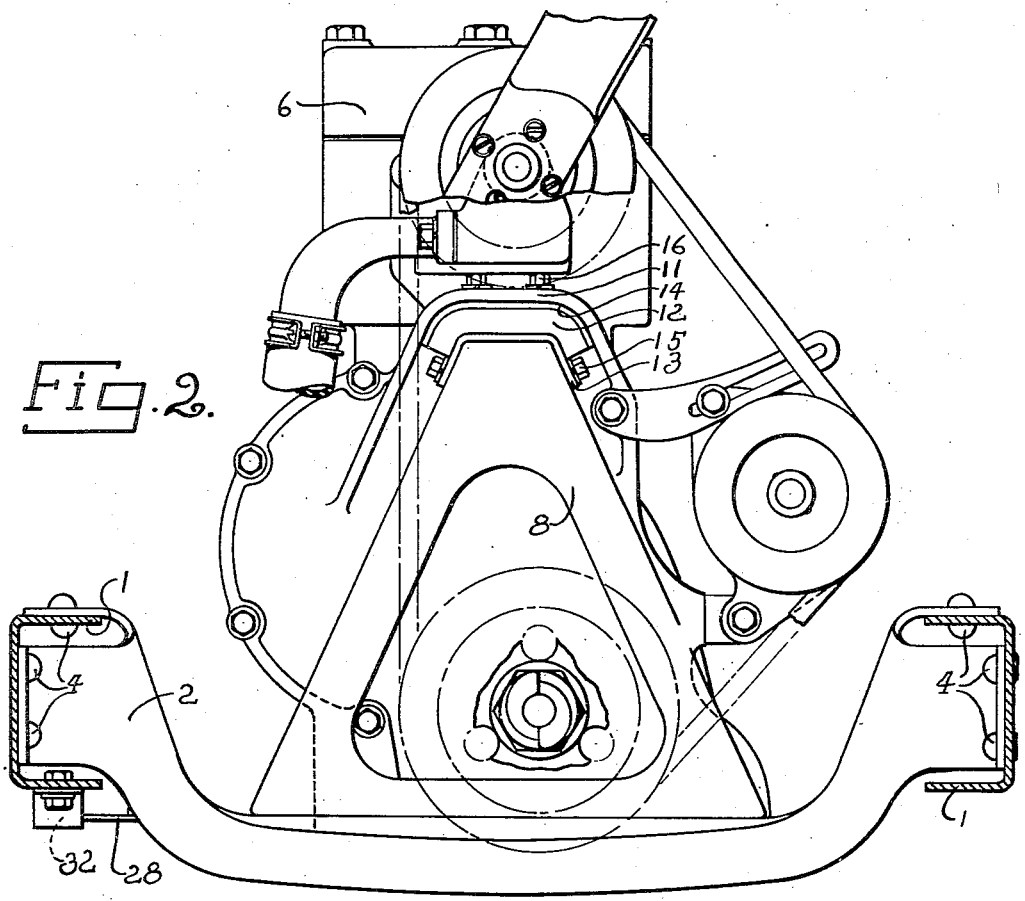
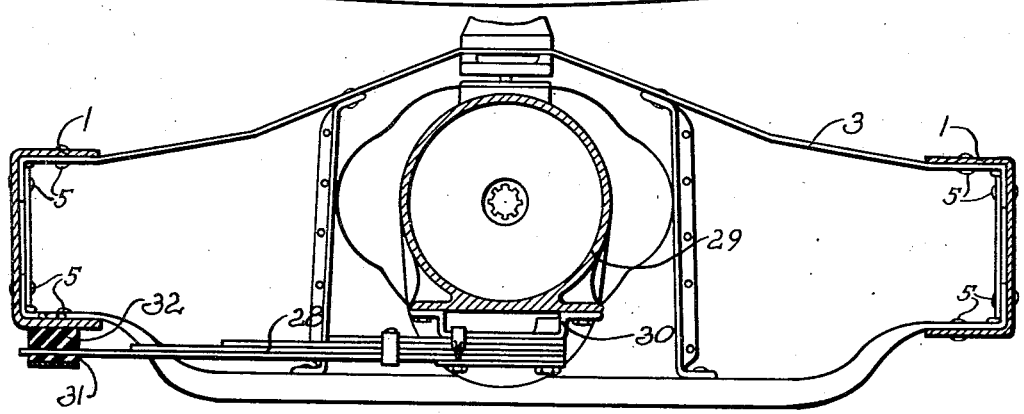

INVENTOR.
ROGER K. LEE.
BY
ATTORNEY.

Patented Oct. 9, 1934

1,975,960

UNITED STATES PATENT OFFICE

1,975,960

INTERNAL COMBUSTION ENGINE MOUNTING

Roger K. Lee, Highland Park, Mich., assignor to Chrysler Corporation, Detroit, Mich., a corporation of Delaware Application June 6, 1931, Serial No. 542,601

10 Claims. (Cl. 248—14.2)

This invention relates to an improved internal combustion engine mounting particularly for vehicles.

When an internal combustion engine is yieldably mounted upon a rigid frame structure in such a manner as to permit rocking of the entire engine structure as a unit, displacement of the center of mass of the unit causes reactions upon the rigid frame structure. In a vehicle, these reactions are directed transversely upon the chassis frame and they are of sufficient amplitude to develop excessive vibrations.

A yieldably mounted internal combustion engine is oscillated by the torque reaction impulses which result from the application of the thrusts of the pistons upon a main driving shaft following the individual explosions in the combustion chambers, and which occur in precisely the same frequency as the explosions. For this reason, the torque impulses and the oscillations they create vary in frequency in correspondence with the speed at which the engine is operated.

The entire yieldably mounted engine unit, like all other bodies, has a definite and fixed vibration rate, known as the natural vibration frequency, at which it will vibrate when set in motion. The time of each oscillation of such a body is expressed by the formula $$T = 2\pi\sqrt{I/C},$$

wherein; T=time, I=moment of inertia and C represents the resistance resiliently opposing angular displacement of the body. When the frequency of the torque impulses synchronizes with the natural vibration frequency of the engine, severe vibrations are developed. This is also true at the harmonics of the torque period and the natural vibration frequency of the engine on its mounting.

The magnitude of the transverse thrust applied to the rigid frame by each oscillation is proportional to the displacement of the center of mass of the engine and can be reduced to a minimum by having the engine oscillate about an axis which passes through its center of mass. This relation of the pivotal axis of the engine, with respect to its center of mass, reduces the moment of inertia of the system and tends to reduce the time of each oscillation and to increase the natural vibration rate of the system, as will be understood from an inspection of the above formula. The resistance resiliently opposing angular displacement of the system may, however, be predetermined to compensate for the reduction of the moment of inertia, so as to prevent synchronizing of the torque impulses with the natural vibration frequency in the driving range of the engine.

The main object of the invention is to provide in a motor vehicle, an internal combustion engine mounting of such character as to prevent excessive vibration of the motor vehicle due to the operation of the engine. With this end in view, leading objects of the invention are to provide a mounting for a power plant unit including an internal combustion engine which, while permitting oscillation of the unit under the influence of the torque reaction impulses, will prevent substantial displacement of the center of mass thereof during such oscillation; to provide a mounting of this character which maintains the moment of inertia that opposes oscillation of the engine unit at a low value so as to obviate the application of transversely directed reaction thrusts upon a vehicle chassis, or on the rigid frame structure by which the unit is supported; to provide yieldable members for independently supporting the weight of the engine unit which also permit oscillation of the said unit about the approximately proper axis; to provide resilient means cooperating with the mounting for predetermining the natural vibration frequency of the unit.

In general, the invention consists in providing, upon the motor vehicle frame, mounting members for the power plant unit, including an internal combustion engine, which members shall be of such character and so located as to provide an axis of oscillation passing substantially through the center of mass of the power plant unit, and permit oscillation of the unit about such axis. Thus, the torque reaction impulses will be dissipated in the oscillatory movement of the unit but there will be substantially no displacement of the center of mass because the oscillatory movement of the unit takes place about an axis passing through the center of mass. As applied to power plant units of the type commonly used in automobiles, in which the center of mass is located above the axis of the engine crank shaft, although not necessarily in the vertical plane thereof, the invention contemplates the provision of mounting members for the power plant unit of such character and so located as to provide an axis of oscillation for said unit extending at an angle to the crank shaft axis and passing through the center of mass of the unit. In other words, the invention contemplates mounting the power plant unit upon members which permit an oscillatory movement of the unit about an axis passing through the center of mass. The invention consists, further, in utilizing resilient members, preferably non-metallic, such as rubber, as the means for providing the axis of oscillation, whereby the weight of the power plant unit is yieldably supported and transverse reactions upon the chassis frame are obviated. The invention also consists in providing mounting elements of such character and so located as to provide an axis of oscillation for the unit passing substantially through the center of the connections, at the front end of the main shaft, through which power is transmitted to said shaft, as well as through the center of mass of the power plant unit. The invention also consists in providing means which resiliently oppose angular displacement of the power plant unit about the axis of oscillation provided by the mounting members. Such means will be so selected as to predetermine the resistance resiliently opposing angular displacement, so that the natural vibration frequency of the system, determined as stated by the formula $$T = 2\pi\sqrt{I/C},$$

will not synchronize with the torque impulses in the driving range of the engine. That is to say, the value of I, the moment of inertia of the unit, is caused to approach a minimum by causing the axis of oscillation to pass substantially through the center of mass, and the means resiliently opposing angular displacement of the unit about such axis is so selected that the value of C in the formula will give a value for T, such that the natural vibration frequency of the unit will not synchronize with the frequency of the torque impulses within the driving range of the engine. The resistance resiliently opposing angular displacement of the unit may be furnished, in part at least, by the members which provide the axis of oscillation, but may be supplemented by additional means furnishing such resistance.

An illustrative embodiment of the invention is shown in the accompanying drawings, in which:

Fig. 1 is a side elevation, partly in section, of an internal combustion engine which is supported upon a mounting that embodies my invention.

Fig. 2 is a front end elevation showing the mounting and engine installed in a vehicle chassis.

Fig. 3 is a fragmentary transverse section taken on the line 3—3 of Fig. 1.

Figure 4:
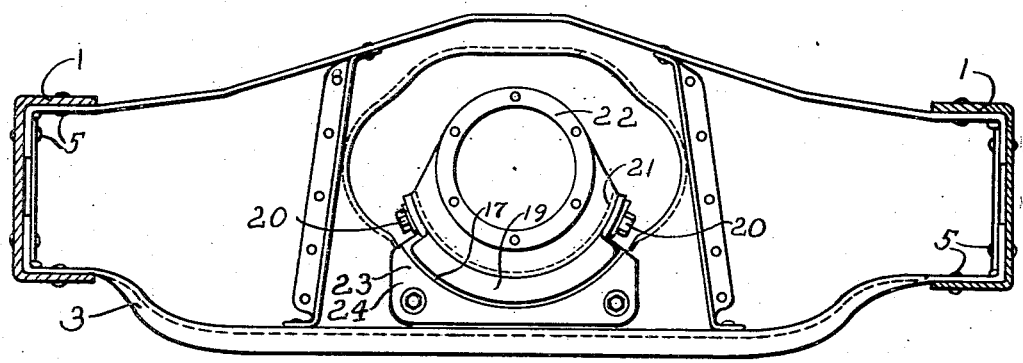
Fig. 4 is a transverse vertical section taken on the line 4—4 of Fig. 1.

In the form shown, my improved internal combustion engine mounting is illustrated in conjunction with a vehicle chassis frame which includes side channel members 1, between which extend rigid transverse front and rear structures 2 and 3 respectively. The front transverse structure 2 is rigidly secured at its ends to the side channel members 1 by rivets 4 and the rear transverse structure 3 is rigidly secured to these side members by rivets 5.

Located between the side members 1 and the transverse structures 2 and 3 is a power plant unit including a multiple cylinder internal combustion engine 6 having a crank shaft 7, which extends longitudinally of the chassis frame, and pistons and connecting rods (not shown) which operate in planes that are normal to the axis of the crank shaft. A rigid support 8 of triangular shape is fixed to the front transverse structure 2 by bolts 9, or other suitable means. The top of the support 8 is located substantially at the upper extremity of the crank case 10 of the engine slightly below a forwardly protruding flange 11 which is integrally formed on the upper end of the crank case.

The front end of the engine is tiltably supported on the upper extremity of the support 8 by a rubber block 12 which is disposed between an inner metal bracket 13 and an outer metal bracket 14. The rubber block 12 is rigidly fixed independently to the brackets 13 and 14 which are secured to the support 8 and flange 11 by bolts 15 and 16, respectively. The brackets 13 and 14 are preferably bonded by vulcanization to the opposite sides of the block 12.

The rear end of the engine 6 is tiltably mounted on the rear transverse structure 3 of the chassis frame by an arcuate shaped rubber element 17 which is confined within a channel 18 of an arcuate shaped bracket 19 that is rigidly fixed by bolts 20 on a flange 21 protruding from the rear end of the transmission housing 22 of the engine. The rubber element 17 is rigidly secured to the bracket 19, preferably by vulcanization, and it is rigidly attached in a similar manner to an arcuate shaped bracket 23 having a flange 24 bolted to the rear transverse structure 3, as shown in Figs. 1 and 4.

The rubber element 12 at the front end of the power plant unit provides what may be termed an axis locating point, at the upper end of the support 8, about which the front end portion of the engine is tiltable, and the rubber element 17 tiltably supports the rear end of the engine, the so-called axis locating point formed by the rear yieldable supporting structure being located substantially at the center of curvature of the arcuate brackets 19 and 23. Since the rubber elements 12 and 17 are of substantial width, they provide, in reality, relatively short axes, the midpoints of which are considered the main axis locating points, above mentioned. These are designated by the numerals 24 and 25, respectively, provided by the front and rear supporting structures, and are located in alignment with each other and substantially with the center of mass of the engine, designated by the numeral 26. This alignment of the axis locating points with the center of mass of the engine causes oscillation of the latter to occur about an axis, illustrated by the line 27, which extends substantially through the center of mass. That is to say, the rubber elements 12 and 17 are of such character and so located as to provide an axis of oscillation for the power plant unit, passing through the center of mass, 26. The rubber elements 12 and 17, therefore, permit oscillatory movement of the engine about said axis of oscillation. It should be noted that the upper end of the support 8, which carries the rubber cushion 12, is not directly above the crank shaft 7, but is slightly offset laterally, as shown in Fig. 2. By such positioning of the member 12, the axis of oscillation is so located as to pass through the center of mass of the power plant unit, although, due to unsymmetrical distribution of mass, such center of mass is not situated in the vertical plane passing through the crank shaft axis. It will be noted, by reference to Figs. 1 and 4, that the rear axis locating point 25 is located substantially at the center of the universal joint at the rear end of the transmission 22, customarily employed to connect the power plant with the main shaft 7'.

Conventional internal combustion engines of the type used in motor vehicles have their mass asymmetrically distributed with respect to the crank shaft, and therefore the center of mass of the engine is generally located above the axis of the crank shaft and in employing my invention in the mounting of such units, the axis of oscillation about which the unit is tiltable is inclined with respect to the axis of the crank shaft, as shown in Fig. 1. In the form shown, the axis of oscillation of the engine extends forwardly and upwardly from the region at which power is transmitted from the engine to an external member, such as the main drive shaft 7' of the vehicle.

Since the axis of oscillation passes substantially through the center of mass of the engine, the center of mass is not displaced during oscillation of the engine in response to the torque reaction impulses. By avoiding displacement of the center of mass of the engine incident to the oscillatory movement of the latter in dissipating the torque reaction impulses, the latter are not suddenly opposed, and therefore the application of violent transversely directed thrusts upon the chassis frame is prevented. These torque reaction impulses are gradually dissipated during oscillation of the engine through a substantial arcuate distance, but they are not suddenly opposed by a moment of large value which exists when the center of mass of the engine is located at a substantial distance from the axis of oscillation.

In a mounting of this kind which permits the oscillatory movement of the power plant unit about an axis that extends through the center of mass of the entire system, the moment of inertia of the system with respect to its axis is reduced to a low value. This reduction in the moment of inertia tends to increase the natural vibration frequency of the system to such an extent that such frequency would, without proper precaution, synchronize with the frequency of the torque reaction impulses during the driving range of operation of the engine. This condition is highly undesirable, for when the torque impulses are in phase, or in harmonic relation with the natural vibration rate, severe vibration is created in the frame and body structure of the vehicle.

The natural vibration rate of the engine is maintained low enough so that the frequency of the torque reaction during the driving stage of the engine will not synchronize with the natural vibration characteristics of the engine. In the form shown, the natural vibration frequency of the engine is definitely established at a sufficiently low rate by mounting the engine upon the rubber blocks 12 and 17, which not only provide the axis of oscillation, but afford some resistance resiliently opposing angular displacement of the engine, and independently retarding angular displacement by apparatus which coacts between the engine and the frame of the vehicle resiliently opposing angular displacement of the engine. The angular displacement resisting apparatus includes a flexible leaf spring 28 which is fixed at its rigid end to the lower side of the clutch housing 29 of the engine by a bracket 30. The flexible end of the leaf spring 28 is received in a slot 31 formed in a rubber block 32 which is fixed on the lower side of the channel member 1 of the frame, as shown in Fig. 3. The leaf spring 28 bends freely when the engine is urged in a counterclockwise direction about its axis of oscillation by the reaction of the torque impulses, and it controls the natural vibration frequency of the system so as to avoid synchronizing of the latter with the frequency of the torque reactions during the driving range. This angular displacement resisting apparatus may, if desired, include a rigid transversely extending arm having one end fixed and the other end yieldably connected by a rubber cushion, to the engine and frame respectively, or vice versa.

With the above mounting and internal combustion engine assembly, reaction upon the frame structure resulting from oscillation of the engine under the influence of the torque reaction impulses is reduced to a minimum by the substantially accurate balance of the engine, and synchronizing of the natural vibration frequency of the system with the frequency of the torque impulses during the driving range of the engine is avoided. As a result, the application of shock and vibration upon the chassis frame by operation of the engine is materially reduced during driving at a constant speed as well as during deceleration and acceleration of the vehicle.

The yieldable elements 12 and 17 support the main weight of the engine and freely permit oscillation thereof about the axis of oscillation which extends lengthwise of the engine and with respect to which a low moment of inertia is present, but they are of such character and so located as to resist oscillation of the unit about a transverse axis under the influence of reciprocation of the pistons.

Figure 5:
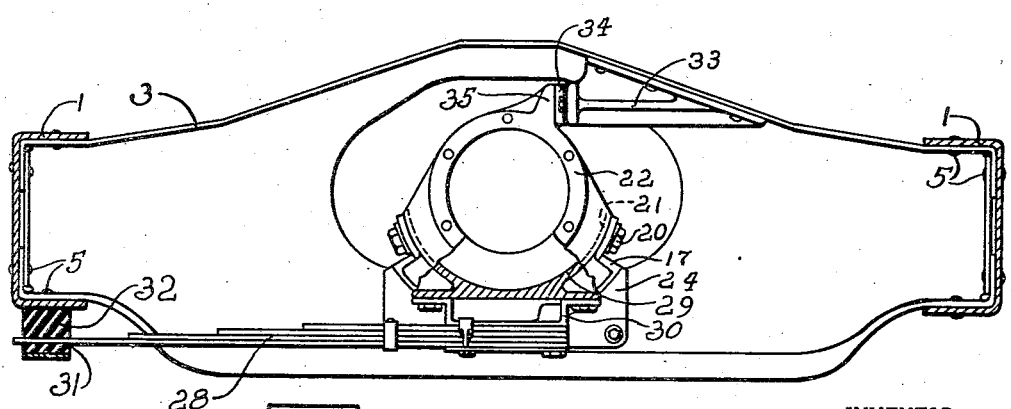
Fig. 5 is a transverse section, similar to Fig. 3, of a mounting and internal combustion engine assembly, illustrating a further embodiment of the invention.

In Fig. 5 is shown a mounting and internal combustion engine assembly similar to that illustrated in Figs. 1 to 4, inclusive, and having corresponding parts designated by the numerals used in the description of the latter figures. The structure illustrated in Fig. 5 includes, in addition to that presented in Figs. 1 to 4, a stop 33 which is mounted on the right side of the rear transverse structure 3 and which has a yieldable pad 34, preferably comprising rubber, on its inner extremity. The pad 34 registers with an upright vertical flange 35 on the transmission housing 22 of the engine assembly, which is normally held against the pad with an initial compression by the spring 28 of the angular displacement resisting apparatus when the engine is not operating, and when the torque reaction impulses are of insufficient magnitude to rotate the system in a counterclockwise direction, as viewed in Fig. 5, against the action of the spring 28. When the torque reaction impulses are of sufficient magnitude to rotate the flange 35 out of engagement with the pad 34, the actions described in the discussion of Figs. 1 to 4, inclusive, occur in the manner set forth above.

It is to be understood that this invention is concerned with the oscillatory movement of the engine and all parts so attached thereto so as to oscillate as a unit therewith and that, whenever I have referred to the "engine", "engine unit", "power plant unit", or "internal combustion engine assembly", I mean to include all parts which are mounted on the engine proper, so as to oscillate as a unit therewith. While I have herein shown and described an engine which includes a transmission, it will be readily understood that such transmission may be omitted or separately mounted, such a construction merely changing the center of mass of the engine and requiring relocation of the engine supports to permit the engine to oscillate through its new center of mass.

Although but several specific embodiments of this invention have herein been shown and described, it will be understood that various changes in the size, shape and arrangements of parts may be made without departing from the spirit of my invention, and it is not my intention to limit its scope other than by the terms of the appended claims.

What I claim is:

1. In combination, an internal combustion engine unit having an inherent tendency, when operated under load, to oscillate, a support, and a plurality of rubber mountings for the engine, bonded to engine and support parts, respectively, and so constructed and arranged as to offer resistance to movement of the engine, the resistance to movement in a direction laterally of the engine crank shaft being less than the resistance to movement vertically thereof said mountings being located near the longitudinal central vertical plane of the engine.

2. In combination, an internal combustion engine unit, a support, and a plurality of rubber mountings for the engine so connected with said engine unit and so constructed and arranged as to permit slight rocking movement of the engine on an axis passing through a vertical plane of the engine and bonded to engine and support parts, respectively, and adapted to offer resistance to movement of the engine, greater in the movement vertically thereof than in a movement laterally thereof.

3. In combination, an internal combustion engine unit having an inherent tendency, when operated under load, to oscillate, a support, and a plurality of rubber mountings for the engine so connected with said engine unit as to permit slight rocking movement of the engine on an axis passing through a vertical plane of the engine and bonded to engine and support parts, respectively, at least one of said mountings being so constructed and arranged as to offer resistance to movement of the engine, greater in the movement vertically thereof than in a movement laterally thereof.

4. In combination, an internal combustion engine, a support, and rubber mountings for the engine, spaced longitudinally thereof, positioned near the longitudinal central plane of said engine so as to provide for and permit rocking movement of the engine on its mountings, said mountings being bonded to engine parts and support parts, respectively, and rocking movement of the engine being resisted by stretching said rubber mountings.

5. In combination, an internal combustion engine, a support, and cushion mountings for the engine, spaced longitudinally thereof, positioned near the longitudinal central vertical plane of said engine so as to provide for and permit rocking movement of the engine on its mountings, at least one of said mountings comprising rubber, and so arranged as to carry a portion of the engine weight under compression, said rubber being bonded to an engine part and a support part, respectively, and resisting upward movement of the engine, at the mountings, by tension of the rubber.

6. In combination, an internal combustion engine, a support, and rubber mountings for the engine, spaced longitudinally thereof, positioned near the longitudinal central vertical plane of the engine and carrying the major portion of the engine weight by compression on the rubber, said rubber being bonded to engine parts and support parts, respectively, and so arranged as to resist upward movement of the engine, at the mountings, by tension of the rubber.

7. In combination, an internal combustion engine, a support, and rubber mountings for the engine, spaced longitudinally thereof, positioned near the longitudinal central vertical plane of the engine and carrying a substantial portion of the engine weight by compression of the rubber, said rubber being bonded to engine parts and support parts, respectively, and so arranged as to resist upward movement, as well as lateral rocking movement of the engine, at the mountings, by stretching of the rubber.

8. In combination, an internal combustion engine unit, a support, and mountings for said unit, at least one of said mountings including a rubber member bonded to an engine part and to a support part, said rubber member being arched throughout at least a portion of its extent transversely of the engine crank shaft, said arched portion being materially less than a complete circle.

9. In combination, an internal combustion engine unit having an inherent tendency, when operated under load, to oscillate, a support, and a plurality of cushion mountings for the engine spaced longitudinally of the engine crank shaft and so connected with said engine unit as to permit slight rocking movement of the engine on an axis passing through a vertical plane of the engine, at least one of said mountings being of rubber bonded to engine and support parts, respectively, and being so constructed and arranged as to offer resistance to rocking movement of the engine by stretching of the rubber.

10. In combination, an internal combustion engine unit having an inherent tendency, when operated under load, to oscillate, a support and a plurality of cushion mountings for the engine spaced longitudinally of the engine crankshaft and so connected with said engine unit as to permit slight rocking movement of the engine on an axis passing through its center of mass, said mountings being so constructed and arranged as to progressively yieldingly resist oscillation of the engine in greater degree as the amplitude of engine movement increases.

ROGER K. LEE.

CERTIFICATE OF CORRECTION.

Patent No. 1,975,960. October 9, 1934.

ROGER K. LEE.

It is hereby certified that error appears in the printed specification of the above numbered patent requiring correction as follows: Page 4, line 47, claim 4, after "central" insert the word vertical; and that the said Letters Patent should be read with this correction therein that the same may conform to the record of the case in the Patent Office.

Signed and sealed this 9th day of April, A. D. 1935.

Leslie Frazer (Seal)

Acting Commissioner of Patents.